Patented Apr. 23, 1929.

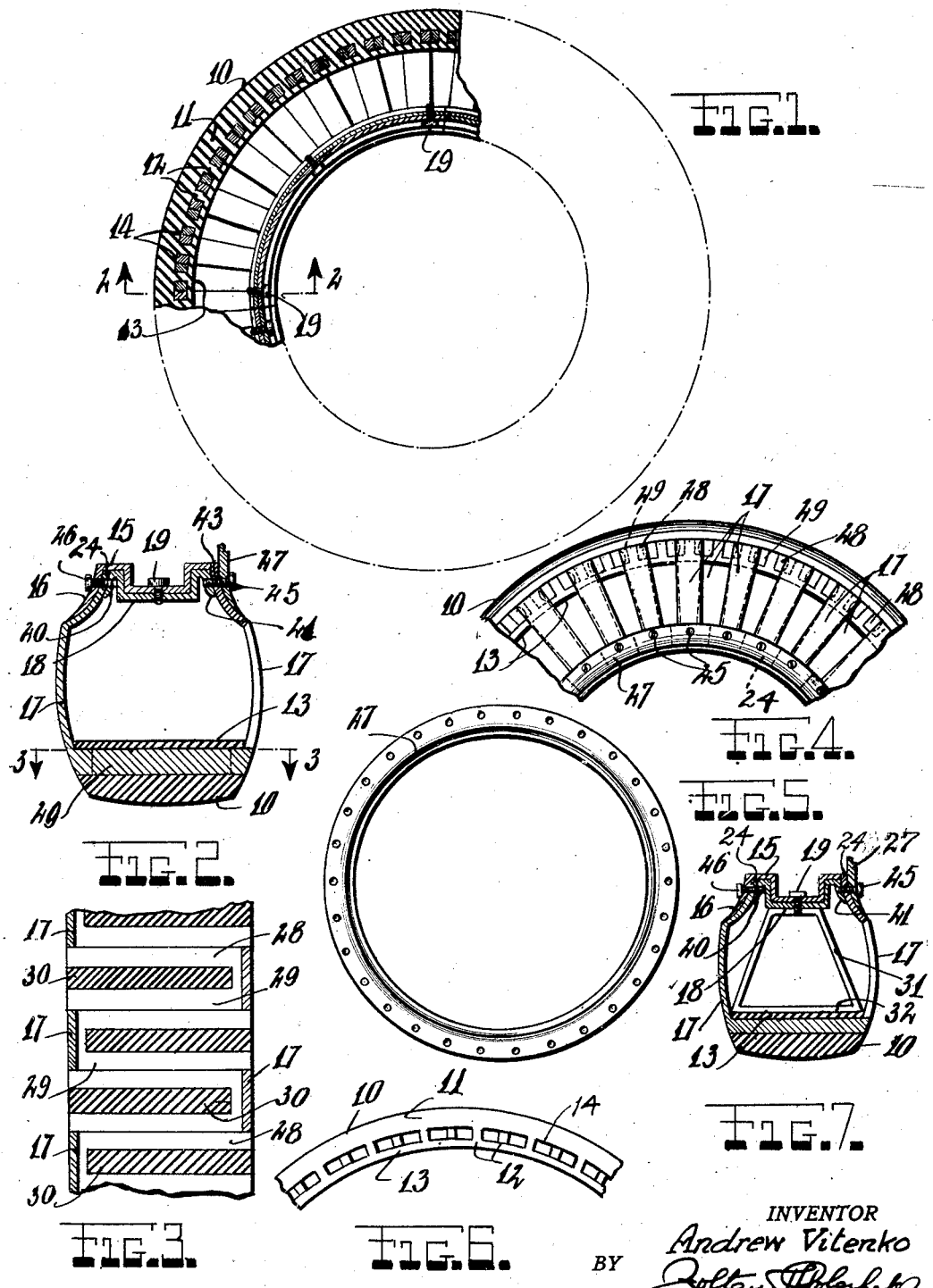

1,710,524

UNITED STATES PATENT OFFICE.

ANDREW VITENKO, OF NEW YORK, N. Y.

SPRING TIRE.

Application filed October 24, 1927. Serial No. 228,115.

This invention relates to a resilient vehicle tire and has for its object the provision of a plurality of individual resilient supporting members arranged to support a rubber traction rim or tire.

Another object of my invention is the provision of a resilient vehicle tire comprising replaceable resilient supports adapted to removably secure a rubber traction rim in place.

Other objects of my invention will appear hereinafter, the novel features and combinations being more clearly set forth in the appended claims.

In the drawings:

Fig. 1 is a fragmentary circumferential sectional view of a tire embodying my invention.

Fig. 2 is a transverse sectional view taken on the line 2—2 of Fig. 1.

Fig. 3 is a fragmentary sectional view taken on the line 3—3 of Fig. 2.

Fig. 4 is a side elevational view of a portion of an assembled vehicle tire.

Fig. 5 is a side elevational view of a detachable rim flange embodied in my invention.

Fig. 6 is a fragmentary side elevational view of the rubber traction rim embodied in my invention.

Fig. 7 is a transverse sectional view of a tire embodying a modified form of my invention.

Referring particularly to the drawing the numeral 10 designates a rubber traction rim comprising an outer section 11 and intermediate section 12 and an inner section 13. The intermediate section 12 is provided with a plurality of spaced apart apertures 14 of rectangular cross section. An inner rim 15 comprising an outwardly disposed intermediate portion and a side flange 16 is disposed concentric relative to the traction rim 10 and is resiliently connected therewith by a plurality of individual resilient supports 17 hereinafter more clearly set forth. An intermediate rim 18 formed to conform with the curvature of the inner rim 15 is mounted in superimposed relation to the latter and rigidly secured thereon by screws 19. The flanges 20 and 21 of the intermediate rim 18 are disposed outwardly, the flange 20 being positioned in spaced relation to the flange 16 and substantially parallel thereto as illustrated in Fig. 2.

The resilient supports 17 are disposed between the inner and intermediate rims 15 and 18, respectively, and the outer traction rim 10 and each comprises a strip of spring steel formed substantially as illustrated in Fig. 2 with a belly at the intermediate portion. The inner extremities of the strips 17 are provided with integral shanks 24 having apertures 23 therein. The shank portion of the strips or supports 17 of the left hand side of the tire as viewed in Fig. 2 is disposed between the flange 16 of the inner rim 15 and the flange 20 of the intermediate rim 18. Screws 26 are screw threaded in apertures in the flanges 16 and 20 and through the aperture 23 of the shanks 24. These screws serve to clamp the shanks 24 firmly between the flanges 16 and 20 for firmly holding the supports 17 in the outwardly disposed position illustrated, it being understood that the shanks 24 are in the shape of segments of a ring and that the ends of each are adapted to firmly engage the ends of the adjacent shank.

The shanks of the supports 17 of the right hand side of the tire as viewed in Fig. 2 are firmly clamped by screws 25 between the flange 21 of the intermediate rim 18 and a ring member 27 illustrated in Figs. 2, 4, 5 and 7. It should be understood that the inner portions of the supports 17 are provided with an arcuate curvature and that the flange 16 and ring 27 are correspondingly formed.

The outer extremities of the supports 17 are provided with forked extensions comprising prongs 28 and 29 which are disposed transversely across the tire. These prongs are inserted through the apertures 14 in the intermediate portion 12 of the rubber rim as shown in Figs. 2 and 3.

It will be seen in Figs. 1, 3, and 4 that the supports 17 of the right and left hand side of the tire are arranged in staggered relative position and that the prongs of the supports of one side are oppositely disposed relative to the prongs of the other side. The inner section of the rubber rim is disposed within the space between the prongs 28 and 29 and the intermediate ring 18. It should be understood that the above described construction is such as will retain the rubber rim 10 resiliently in spaced relation to the inner rim 15, the latter of which may be mounted on a vehicle wheel by lugs in the manner customarily used in automobile construction. It should be understood also that the inner and intermediate rims 15 and 18 may comprise steel or other suitable material which may be conveniently formed in the shape disclosed and described.

The tire may be assembled by first mounting the supports 17 of the left hand side of the device as viewed in Fig. 2 between the flanges 16 and 20 as above described: the prongs of the supports being disposed to the right. With half the prongs so mounted the outer traction rim 10 may be positioned in place by inserting the prongs 28 and 29 through the apertures 14. This may be conveniently accomplished by laying the tire on its side with the prongs of the left hand supports disposed upwardly and later placing the traction rim 10 above the prongs with the apertures 14 in registration therewith. With the device reclined on its side the prongs of the right hand supports may be driven into the apertures 14 beside the prongs of the left hand supports, it being understood that the apertures 14 are of a size sufficiently small to afford a tight fitting relation between the adjacent prongs. It should also be understood that the neck portion 30 between the adjacent apertures extends between the prongs of the supports. Each support of the right hand side of the tire may be positioned as above described with the inner extremity or shank portion thereof disposed adjacent the flange 21 of the intermediate rim 18. When all of the supports of the right hand side are suitably positioned the rim flange or ring 27 may be disposed over the shank portions with the apertures therein in registration with the apertures of the shanks and with apertures in the flange 21. The screws 25 may then be inserted and tightened for firmly clamping the shanks between the flange 21 and ring 27. It should be understood that when the rubber traction rim 10 wears it may be replaced by disassembling the tire and that injured or broken supports may be readily replaced. The individual supports and the unattached prongs provide a resilient tire which is adapted to absorb slight as well as severe shock and the arrangement described renders the device capable of being conveniently repaired.

In the modified form of my invention illustrated in Fig. 7 springs 31 are disposed between the intermediate rim 18 and the inner side of the outer traction rim 10. The springs 31 comprise an inner section adapted to engage against the intermediate rim 18 having an aperture therein for receiving the screw 19 which firmly secures the spring in place. The outer section 32 of the spring member 31 is longer than the inner section thereof and the side of the spring is inclined outwardly. The section 32 rests against the inner side of the tire portion 13 and is of sufficient length and width to distribute pressure over a large area of the rubber so as not to be submerged therein. It should be understood that the above described construction provides a resiliently supported tire which will absorb severe as well as slight shock.

Obviously, those skilled in the art may make various changes in the details and arrangement of parts without departing from the spirit and scope of my invention.

Having thus described my invention what I claim as new and desire to secure by Letters Patent of the United States is as follows:

1. A resilient tire of the class described comprising an inner rim and an outer rim having spaced apertures extending laterally from the edges thereof intermediate the inner and outer peripheries thereof, individual supports mounted on said inner rim and disposed outwardly therefrom, and prongs on said supports extending into the apertures in said outer rim in spaced relation to the inner and outer peripheries thereof for resiliently attaching said rims together.

2. A resilient tire of the class described comprising an outer solid rubber traction rim, an inner metal rim concentric with said outer rim, resilient supports mounted on the sides of said inner rim, and prongs on the supports of one side of said rim disposed oppositely to prongs on the supports of the other side thereof, said prongs being disposed through apertures in said rubber traction rim for flexibly connecting the same to said inner rim.

3. A resilient tire of the class described comprising a traction rim, an inner rim, a flange on one side of said inner rim, an intermediate rim disposed around said inner rim adjacent thereto comprising side flanges, resilient supports disposed between said inner and outer rims and comprising inner shanks disposed between the flange of said inner rim and the corresponding flange of said intermediate rim, screws threaded in registering apertures in said shanks and said inner and intermediate rims, resilient supports disposed between said inner and outer rims adjacent the flange of the opposite side of said intermediate rim, a ring disposed adjacent the inner portion of said last mentioned supports, and screws threaded in apertures in said flange, supports and ring for firmly clamping said supports between said flange and said ring.

4. A resilient tire of the class described comprising an outer traction rim, an inner rim, a flange on one side of said inner rim, an intermediate rim disposed around said inner rim adjacent thereto comprising side flanges, resilient supports disposed between said inner and outer rims and comprising inner shanks disposed between the flange of said inner rim and the corresponding flange of said intermediate rim, screws threaded in registering apertures in said shanks and said inner and intermediate rims, resilient supports disposed between said inner and outer rims adjacent the flange of the opposite side of said intermediate rim, a ring disposed adjacent the inner portion of said last mentioned supports, screws threaded in apertures in said flange, supports and ring for firmly clamping said supports between said flange and said ring, said traction rim being engaged on the outer portions of said supports, and a series of spring members attached to said inner rim and engaged against the inner side of said traction rim for cooperating with the resilient supports in resiliently retaining the latter rim in spaced relation to the inner rim.

5. A resilient tire of the class described comprising an inner rim, a traction rim concentric with said inner rim, resilient side supports attached at their inner ends to said inner rim and engaged at their outer portions in apertures in said traction rim, and a series of spring members attached to said inner rim and confined between said side supports and engaged against said outer rim for cooperating with the resilient supports in holding the latter rim in spaced relation to said inner rim, each spring comprising inclined converging sides and parallel inner and outer extremities.

In testimony whereof I have affixed my signature.

ANDREW VITENKO.